United States Patent
Alm et al.

(10) Patent No.: US 12,403,845 B2
(45) Date of Patent: Sep. 2, 2025

(54) LIGHT DEFLECTING AIR VENTS FOR LIGHT TRAP

(71) Applicant: QUALCOMM AUTO LTD., Cambridge (GB)

(72) Inventors: Gustav Alm, Vårgårda (SE); Erik Rosenlund, Vårgårda (SE)

(73) Assignee: QUALCOMM Auto Ltd. (GB)

( * ) Notice: Subject to any disclaimer, the term of this patent is extended or adjusted under 35 U.S.C. 154(b) by 0 days.

(21) Appl. No.: 18/550,768

(22) PCT Filed: May 19, 2022

(86) PCT No.: PCT/EP2022/063654
§ 371 (c)(1),
(2) Date: Sep. 15, 2023

(87) PCT Pub. No.: WO2022/243483
PCT Pub. Date: Nov. 24, 2022

(65) Prior Publication Data
US 2024/0157891 A1     May 16, 2024

(30) Foreign Application Priority Data

May 21, 2021 (EP) ..................................... 21175348

(51) Int. Cl.
*B60R 11/04* (2006.01)
(52) U.S. Cl.
CPC ..................................... *B60R 11/04* (2013.01)
(58) Field of Classification Search
CPC ....................................................... B60R 11/04

(Continued)

(56) References Cited

U.S. PATENT DOCUMENTS

| 2016/0167595 A1* | 6/2016 | Kang | H04N 23/57 |
| | | | 348/148 |
| 2017/0274835 A1* | 9/2017 | Kasai | H04N 23/51 |

(Continued)

FOREIGN PATENT DOCUMENTS

| DE | 102011114850 A1 | 4/2013 |
| DE | 102018118209 A1 | 1/2019 |
| WO | 2013019795 A1 | 2/2013 |

OTHER PUBLICATIONS

International Search Report and Written Opinion—PCT/EP2022/063654—ISA/EPO—Aug. 23, 2022.

(Continued)

*Primary Examiner* — Matthew David Kim
(74) *Attorney, Agent, or Firm* — QUALCOMM Auto Ltd.

(57) ABSTRACT

The present disclosure relates to a camera device light-trap arrangement (2) that comprises a lens opening (3), adapted to receive a camera lens assembly (4), and a rim border (5) that is adapted to abut a vehicle windshield (21) and has a width (w) that extends between an outside edge (6) and an inside edge (7). The rim border (5) circumvents an area (A) inside the inside edge (7) and comprises a first plurality of channels (8, 8') that fluidly connect the outside edge (6) and the inside edge (7) when the rim border (5) is mounted to abut a vehicle windshield (21). Each channel (8, 8') comprises inner walls (13, 14, 15) and an open side (16) that is adapted to face a windshield (21). A second plurality of channels (8, 8'), comprised in the first plurality of channels, extend in at least two different extension directions (D1, D2; D1, D3) from the outside edge (6) to the inside edge (7).

15 Claims, 7 Drawing Sheets

(58) Field of Classification Search
USPC .......................................................... 348/148
See application file for complete search history.

(56) References Cited

U.S. PATENT DOCUMENTS

| | | | | |
|---|---|---|---|---|
| 2018/0027151 | A1* | 1/2018 | Kazama | H04N 23/57 |
| | | | | 348/373 |
| 2019/0082150 | A1* | 3/2019 | Murata | B60R 11/04 |
| 2019/0168687 | A1* | 6/2019 | Okuda | H04N 23/57 |
| 2019/0291658 | A1* | 9/2019 | Bingle | G03B 29/00 |
| 2021/0001784 | A1* | 1/2021 | Habibi | G03B 17/55 |
| 2021/0306537 | A1* | 9/2021 | Solar | H04N 23/57 |
| 2022/0239817 | A1* | 7/2022 | Kasarla | B60K 35/23 |
| 2022/0295036 | A1* | 9/2022 | Kurihara | G03B 11/045 |
| 2022/0388213 | A1* | 12/2022 | Filler | B29C 45/372 |
| 2023/0058584 | A1* | 2/2023 | Uken | B60R 1/088 |
| 2023/0060268 | A1* | 3/2023 | Sato | H05B 3/84 |

OTHER PUBLICATIONS

European Search Report—EP21175348—Search Authority—Berlin—Oct. 1, 2021 7 Pages.

* cited by examiner

SECTION A-A

LIGHT DEFLECTING AIR VENTS FOR LIGHT TRAP

This application is a national stage application under 35 U.S.C. § 371 of PCT Application No. PCT/EP2022/063654, filed May 19, 2022, which claims the benefit of EP Application Serial No. 21175348.8, filed May 21, 2021. The entire contents of PCT Application No. PCT/EP2022/063654 and EP Application Serial No. 21175348.8 are incorporated herein by reference in their entirety.

The present disclosure relates to a light-trap arrangement for a vehicle camera device. When mounted to a camera housing, the light-trap arrangement is intended to limit light incoming toward a lens assembly.

Many vehicle environment detection systems comprise one or more sensors such as for example radar sensor, LIDAR sensors, camera devices and ultrasonic sensors. These are used for collecting data used for safety arrangements as well as for driver assistance systems.

Regarding camera devices, a separate light-trap arrangement can be attached to a camera housing, where the light trap arrangement is placed against the windshield to minimize stray light entering the field of view (FOV) of the camera lens.

The area of the windshield that is inside the field of view in the light-trap arrangement needs to be free from fog and ice, which can be accomplished by having heating wires or by allowing air from the vehicle's air condition system to reach that area. Since no light should enter the area, openings in the light-trap arrangement should be designed in a way that let the air in but is blocking direct light.

The document U.S. Pat. No. 9,783,128 discloses several types of such openings in a light-trap arrangement, but more effective and at the same time robust solutions are desired.

It is an object of the present disclosure to provide a light-trap arrangement that is more versatile and effective regarding ventilation of the enclosed windshield area.

Said object is achieved by means of a camera device light-trap arrangement that comprises a lens opening, adapted to receive a camera lens assembly, and a rim border that is adapted to abut a vehicle windshield and has a width that extends between an outside edge and an inside edge. The rim border circumvents an area inside the inside edge and comprises a first plurality of channels that fluidly connect the outside edge and the inside edge when the rim border is mounted to abut a vehicle windshield. Each channel comprises inner walls and an open side that is adapted to face a windshield. The channels in a second plurality of channels, comprised in the first plurality of channels, extend in at least two different extension directions from the outside edge to the inside edge.

In this manner, a light-trap arrangement is provided that is more versatile and effective regarding ventilation of the area that corresponds to an enclosed windshield area, while blocking incident light, than previously known, According to some aspects, the channels in the second plurality of channels extend in an arcuate manner such that a plurality of different extension directions are formed.

In this way, the light-trap arrangement can be adapted for different environments and vehicle properties. Having a plurality of different extension directions increases the number of times that light rays hit the inner walls before entering the camera or hits the windshield, thus lowering the potential energy of the rays before they hit a surface visible to the camera.

According to some aspects, the channels are coated by a matte microstructure.

In this way, reflections in the inner walls are minimized, and light rays that hit the inner walls are thus prevented from propagating by means of reflections.

According to some aspects, the matte microstructure is formed as a texture in an injection molding tool that is used for molding the light-trap arrangement. The texture is formed by means of at least one of photo etching, electrical discharge machining, abrasive sand blasting, and laser.

This means that the texture can be formed in many ways.

According to some aspects, the first plurality of channels is the same as the second plurality of channels.

According to some aspects, any light beam that enters any channel in the second plurality of channels via an outside opening at the outside edge is obscured from exiting the channel via an inside opening at the inside edge, each opening being defined by the inner walls and the open side.

In this manner, a light-trap arrangement is provided that is more versatile and effective regarding ventilation of the area that corresponds to an enclosed windshield area, while blocking incident light, than previously known, According to some aspects, the light-trap arrangement is comprised in a mounting bracket.

This enables a compact camera device to be formed.

According to some aspects, the channels have a rectangular cross-section, a triangular cross-section, or a cross-section that follows wave-form pattern.

Choosing a suitable cross-sectional shape enables the light-trap arrangement to be adapted for different environments and vehicle properties, and to increase the number of times that light rays hit the inner walls before entering the camera or hits the windshield, thus lowering the potential energy of the rays before they hit a surface visible to the camera.

This object is also achieved by means of a camera device associated with the above advantages.

BRIEF DESCRIPTION OF THE DRAWINGS

The present disclosure will now be described more in detail with reference to the appended drawings, where.

DETAILED DESCRIPTION

Aspects of the present disclosure will now be described more fully hereinafter with reference to the accompanying drawings. The different devices, systems, computer programs and methods disclosed herein can, however, be realized in many different forms and should not be construed as being limited to the aspects set forth herein. Like numbers in the drawings refer to like elements throughout.

The terminology used herein is for describing aspects of the disclosure only and is not intended to limit the invention. As used herein, the singular forms "a", "an" and "the" are intended to include the plural forms as well, unless the context clearly indicates otherwise.

Figure 1:
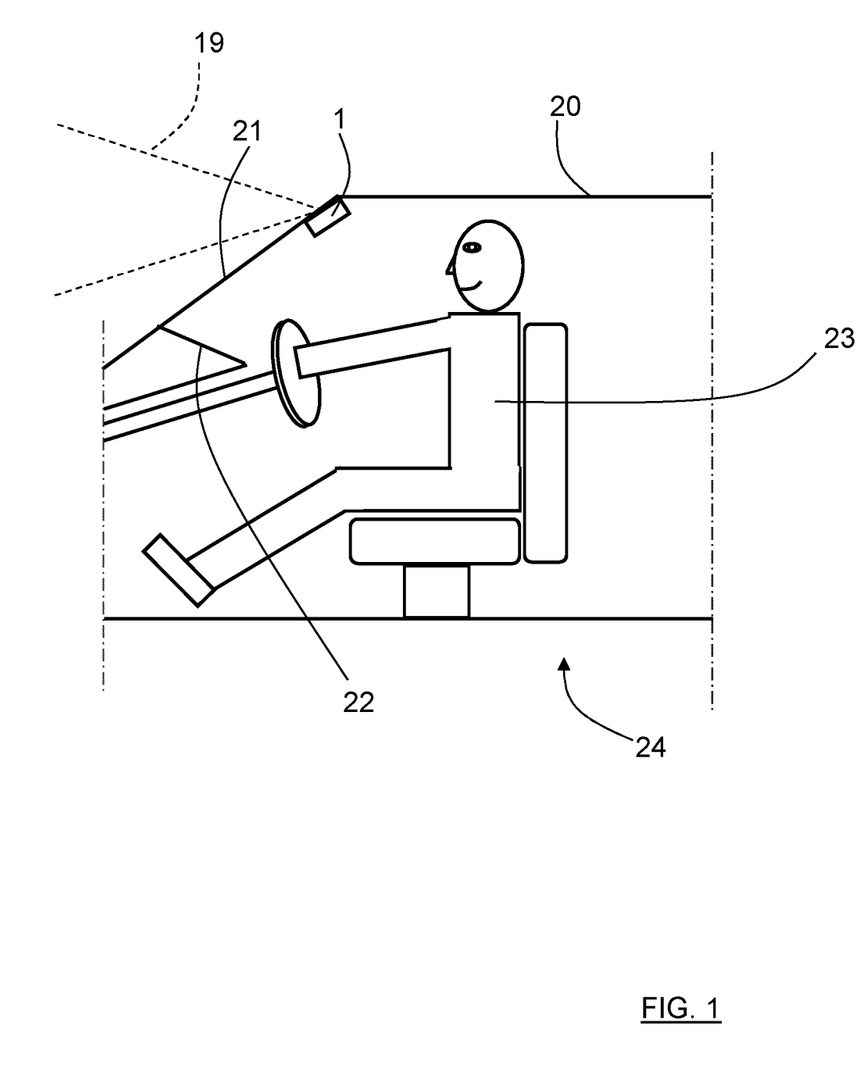
FIG. 1 shows a schematic cut-open part of a vehicle with a camera device.

FIG. 1 schematically shows a cut-open part of a vehicle 24, where the vehicle 24 comprises a digital camera device 1 that is mounted to a windshield 21. The digital camera device 1 is arranged for capturing images of the surroundings outside the vehicle 24 by means of a certain field of view 19. A digital camera device 1 can also, or alternatively, be arranged for capturing images of a driver 23, where these images, which may include eye movements, for example can be used for detecting a degree of driver drowsiness.

Figure 2:
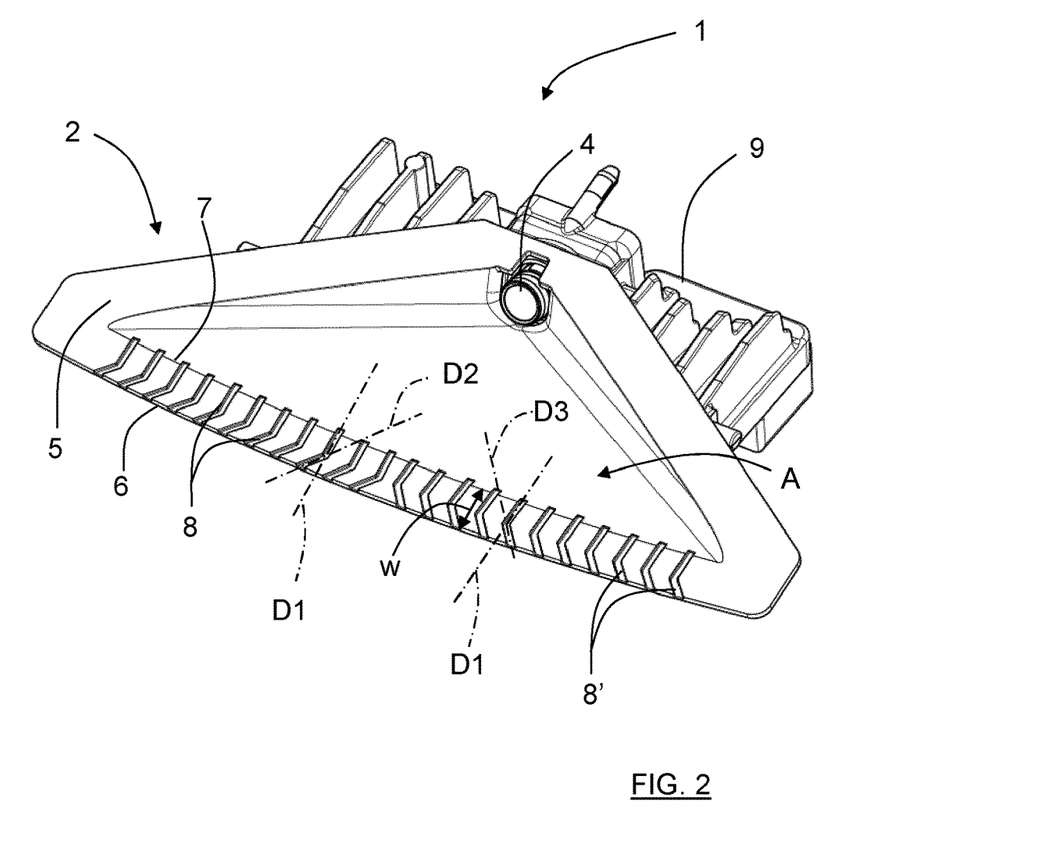
FIG. 2 shows a schematic top perspective view of a lens assembly mounted to a light trap arrangement according to a first example.
Figure 3:
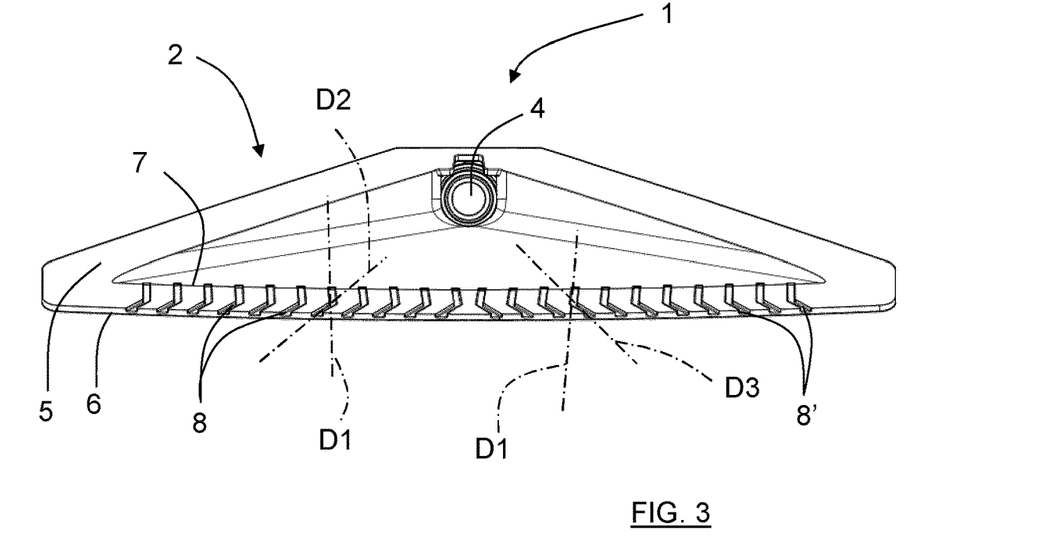
FIG. 3 shows a schematic front perspective view of the lens assembly mounted to the light trap arrangement according to the first example.
Figure 4:
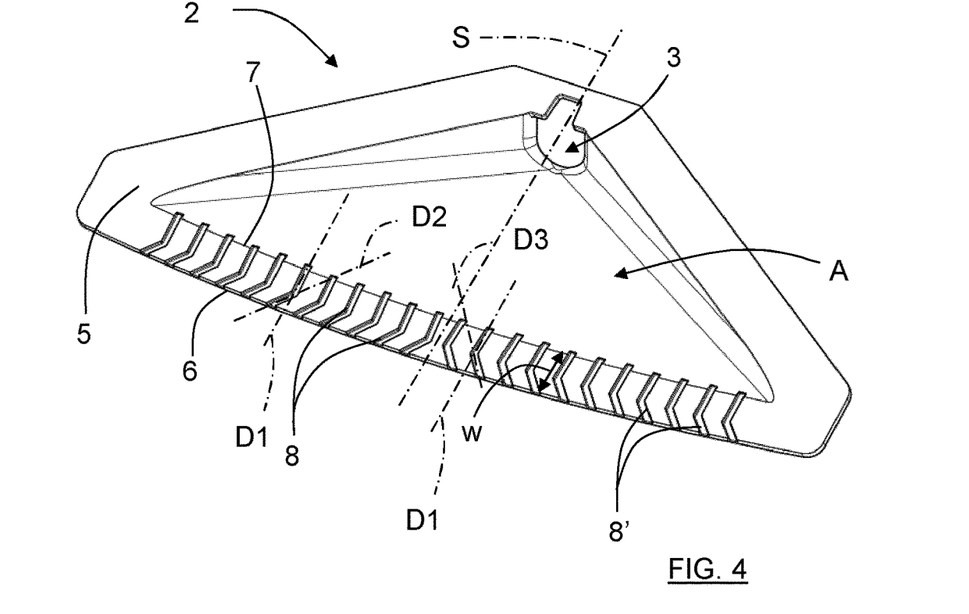
FIG. 4 shows a schematic top perspective view of the light trap arrangement according to the first example.
Figure 5A:
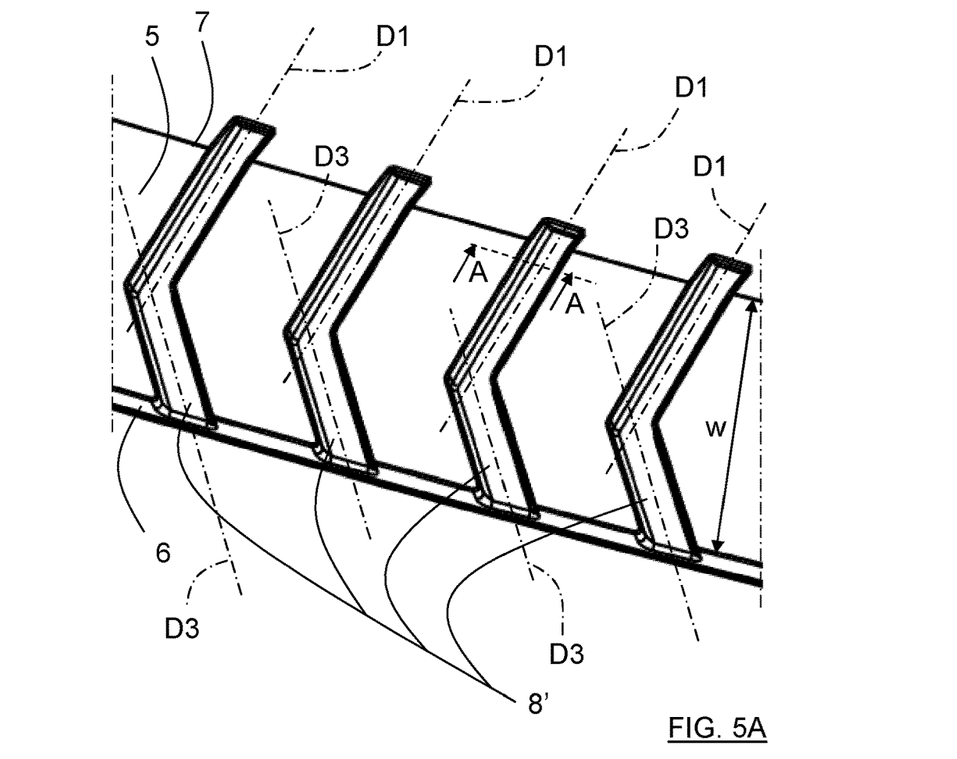
FIG. 5A shows a schematic perspective enlarged view of channels according to the first example formed in the light trap arrangement.

In the following it will be referred to FIG. 2-FIG. 5B that illustrate a first example. FIG. 2 shows a schematic top perspective view of a lens assembly 4 mounted to a light trap arrangement 2, FIG. 3 shows a schematic front perspective view of the lens assembly 4 mounted to the light trap arrangement 2, and FIG. 4 shows a schematic top perspective view of the light trap arrangement 2. FIG. 5A shows a detail view of some of the channels in FIG. 4, and FIG. 5B that shows a section view of a channel in FIG. 5A.

The camera device light-trap arrangement 2 comprises a lens opening 3, adapted to receive a camera lens assembly 4, and a rim border 5 that is adapted to abut the vehicle windshield 21 shown in FIG. 1. The rim border 5 has a width w that extends between an outside edge 6 and an inside edge 7, and circumvents an area A inside the inside edge 7. The rim border 5 comprises a first plurality of channels 8, 8' that fluidly connect the outside edge 6 and the inside edge 7 when the rim border 5 is mounted to abut a vehicle windshield 21. Each channel 8, 8' comprises inner walls 13, 14, 15 and an open side 16 that is adapted to face a windshield 21.

According to the present disclosure, there is a second plurality of channels 8, 8', comprised in the first plurality of channels, where the channels 8, 8' in the second plurality of channels 8, 8' extend in at least two different extension directions D1, D2; D1, D3 from the outside edge 6 to the inside edge 7.

In this manner, a light-trap arrangement is provided that is more versatile and effective regarding ventilation of the area A that corresponds to an enclosed windshield area, while blocking incident light, than previously known, According to some aspects, the first plurality of channels 8 is the same as the second plurality of channels 8. It is also conceivable that one or more channels extend in one extension direction only, these channels not being comprised in the second plurality of channels 8.

In the following, the channels discussed are the channels in the second plurality of channels, i.e. those channels that extend in at least two different extension directions from the outside edge 6 to the inside edge 7.

Figure 5B:
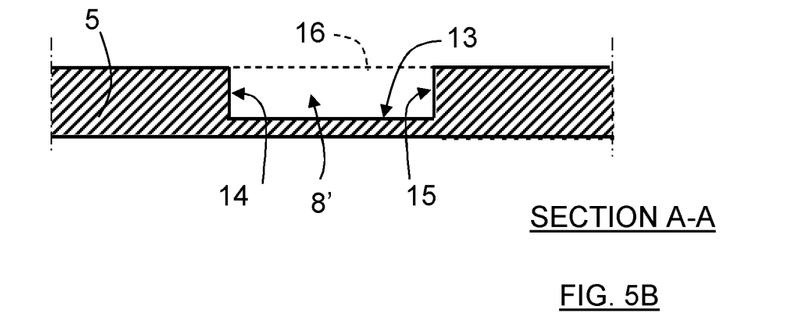
FIG. 5B shows a section view of a channel in FIG. 5A.

It will be appreciated that the term channels is used although a channel 8, 8' comprises inner walls 13, 14, 15 and an open side 16 that is adapted to face a windshield 21. That means that the channel is closed only when the light-trap arrangement 2 is mounted, otherwise the channel is an open channel by means of the open side 16. According to some aspects, each channel is defined by its inner walls 13, 14, 15 and the open side 16.

Here there is a first type of channels 8 and a second type of channels 8' that have a shape that mirrors the shape of the first type of channels 8 in a central symmetry line S that divides the light-trap arrangement 2 in two parts; according to some aspects in two symmetrical parts that are mirror-images of each other.

This ensures an effect air flow towards the enclosed windshield area A.

According to some aspects, the light-trap arrangement may comprise only one type of channels, or several different types of channels.

In this way, the light-trap arrangement can be adapted for different environments and vehicle properties.

Here, the first type of channels comprise channels 8 that extend in a first extension direction D1 and a second extension direction D2 that differs from the first extension direction D1. The second type of channels comprise channels 8' that extend in the first extension direction D1 and a third extension direction D3 that differs from the first extension direction D1 and the second extension direction D2. According to some aspects, the second extension direction D2 is a mirror image of the third extension direction D3 when mirrored in the symmetry line S. The first extension direction is common for the channels 8, 8', but this is of course not necessary. Should these extension directions differ from each other, they could also be mirrored in the symmetry line S.

Figure 8:
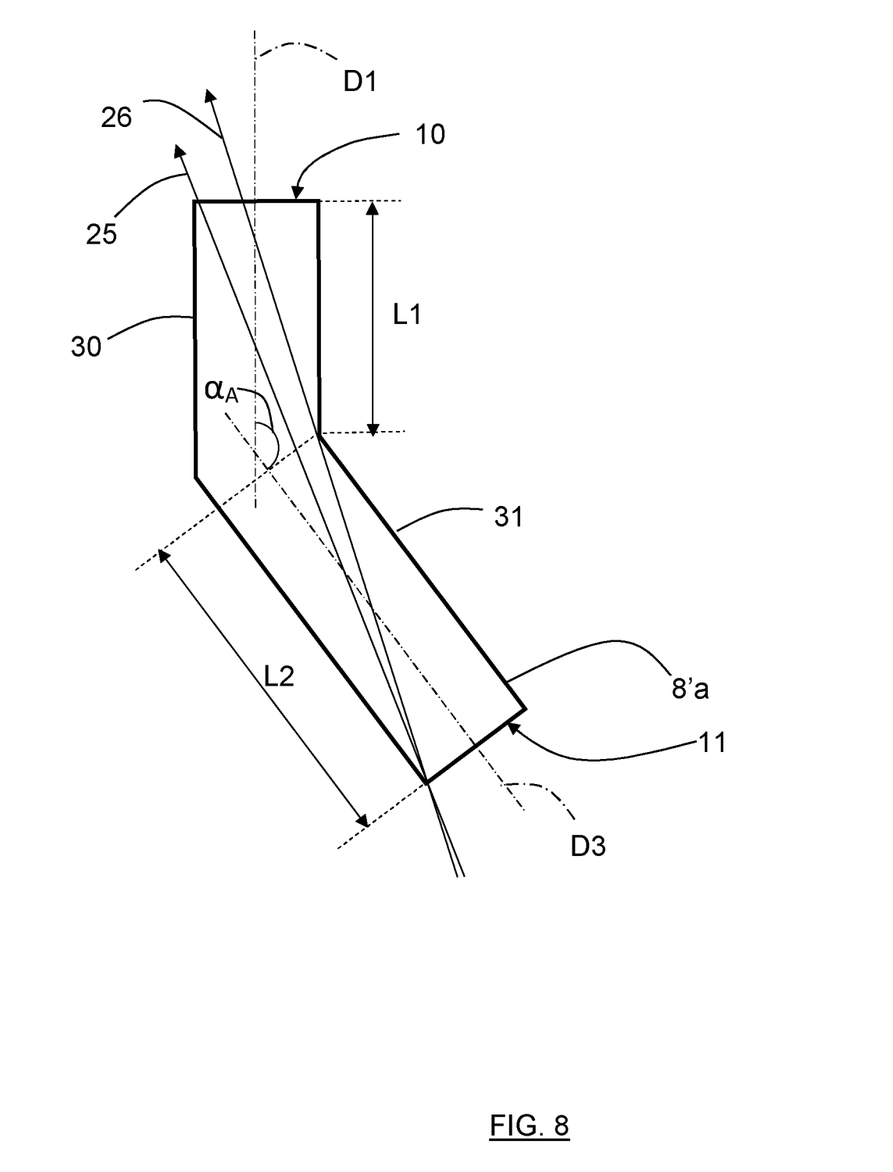
FIG. 8 shows a schematic top view of light rays traveling in a channel where some light rays may pass the channel.

FIG. 8 shows a schematic top view of light rays traveling in a first version of a second type channel 8'a that comprises a first part 30 that extends along the first extension D1 and a second part 31 that extends along the third extension D3, the extensions D1, D3 being differentiated by a first angle $\alpha_A$. The first part 30 has a shortest side with a first length L1 and the second part 31 has a shortest side with a second length L2. The first part 30 comprises an inside opening 10 and the second part 31 comprises an outside opening 11. The openings 10, 11 are defined by the inner walls and the open side as illustrated in FIG. 5B.

Here, the lengths L1, L2 and the first angle $\alpha_A$ have such properties that some light rays 25, 26 may extend through the channel 8'a, between the outside opening 11 and the inside opening 10, while other light rays are obscured and prevented from extending through the channel 8'a.

Figure 9:
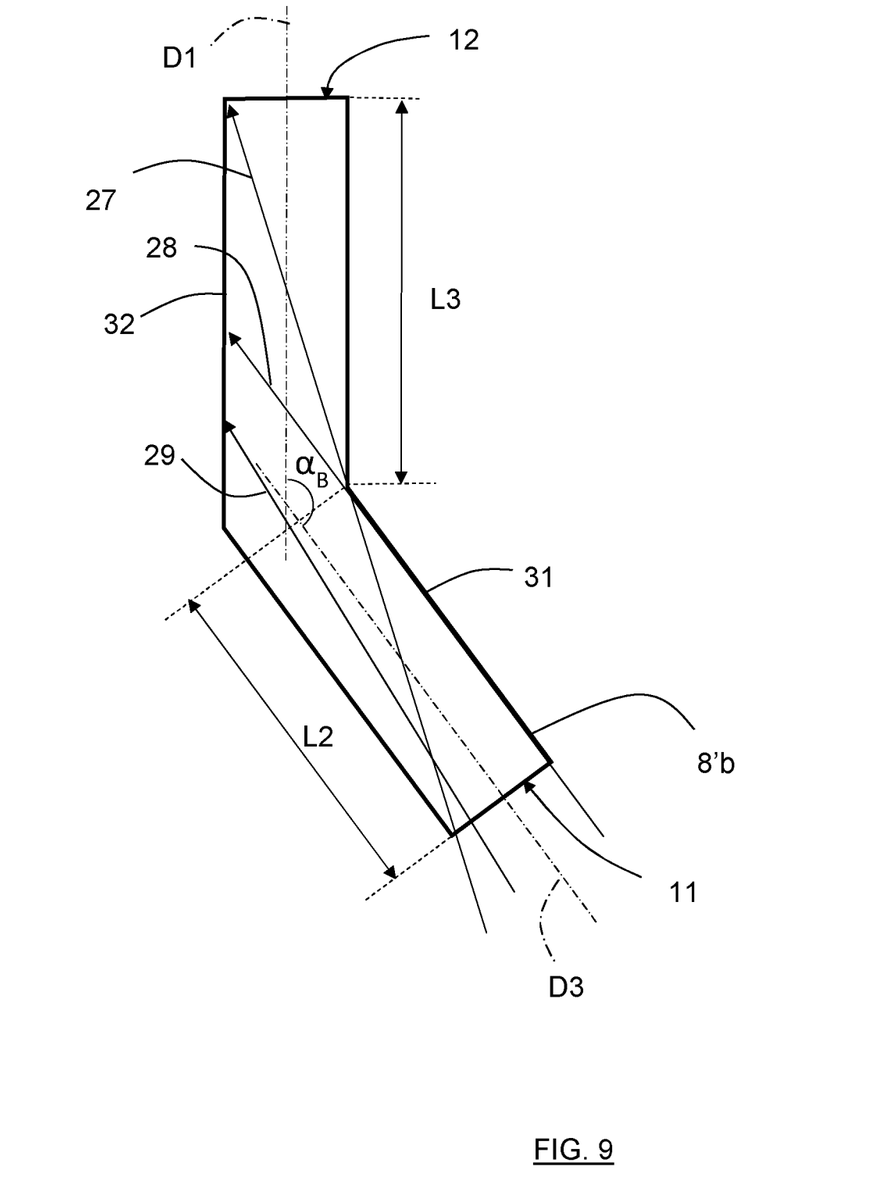
FIG. 9 shows a schematic top view of light rays traveling in a channel where no light rays may pass the channel.

FIG. 9 shows a schematic top view of light rays traveling in a second version of a second type channel 8'b that comprises a first part 32 that extends along the first extension D1 and a second part 31 that extends along the third extension D3, the extensions D1, D3 being differentiated by a second angle $\alpha_B$. The first part 32 has a shortest side with a third length L3 and the second part 31 has a shortest side with a second length L2. The second part 31 of the second version of a second type channel 8'b is in this example the same as the second part 31 of the first version of a second type channel 8'a as described above.

The first part 32 comprises an inside opening 12 and the second part 31 comprises an outside opening 11. The openings 11, 12 are defined by the inner walls and the open side as illustrated on FIG. 5B.

Here, the lengths L2, L3 and the second angle $\alpha_B$ have such properties that no light rays 27, 28, 29 may extend through the channel 8'$b$, between the outside opening 11 and the inside opening 10, all light rays 27, 28, 29 being obscured and prevented from extending unhindered through the channel 8'$b$.

In this particular example, this is achieved by having a third length L3 that exceeds the first length L1, while the first angle $\alpha_A$ equals the second angle $\alpha_B$. Of course, this can also be achieved by having different angle $\alpha_A$, $\alpha_B$, in combination with certain lengths L1, L2; L1, L3.

The examples described above are of course only examples of possibilities, there are many different ways in which the channels can be formed, and a few will be described in the following. According to some aspects, it is preferred that any light beam that enters any channel in the second plurality of channels 8, 8' via an outside opening 11 at the outside edge 6 is obscured from exiting the channel 8, 8' via an inside opening 12 at the inside edge 7, each opening 10, 12 being defined by the inner walls 13, 14, 15 and the open side 16.

Figure 6A:
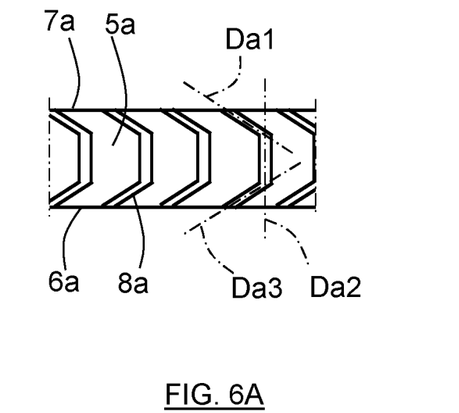
FIG. 6A shows a schematic top view of channels formed in the light trap arrangement according to a second example.

FIG. 6A shows a schematic top view of channels formed in the light trap arrangement according to a second example. According to some aspects, the channels 8$a$ extend between an inside edge 7$a$ and an outside edge 6$a$ in three different extension directions Da1, Da2, Da3 such that an inverted "C"-shape is obtained.

Figure 6B:
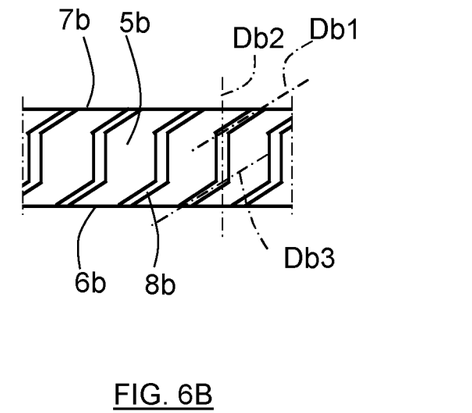
FIG. 6B shows a schematic top view of channels formed in the light trap arrangement according to a third example.

FIG. 6B shows a schematic top view of channels formed in the light trap arrangement according to a third example. According to some aspects, the channels 8$b$ extend between an inside edge 7$b$ and an outside edge 6$b$ in three different extension directions Db1, Db2, Db3 such that an "S"-shape is obtained.

Figure 6C:
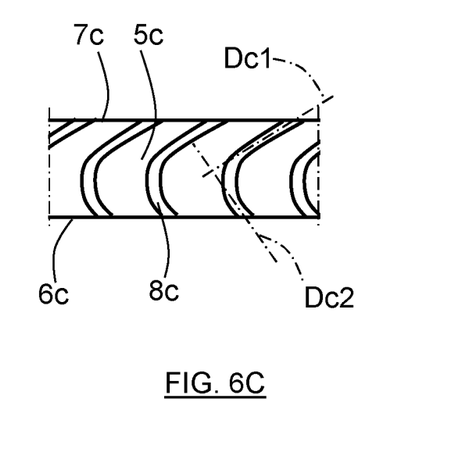
FIG. 6C shows a schematic top view of channels formed in the light trap arrangement according to a fourth example.

FIG. 6C shows a schematic top view of channels formed in the light trap arrangement according to a fourth example. According to some aspects, channels 8$c$ extend between an inside edge 7$c$ and an outside edge 6$c$ in a plurality of different extension directions Dc1, Dc2, such that a "C"-shape is obtained.

Figure 6D:
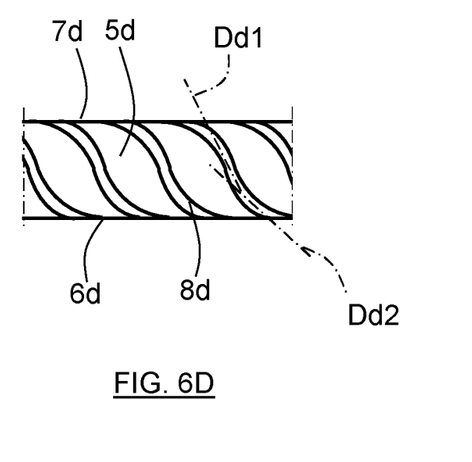
FIG. 6D shows a schematic top view of channels formed in the light trap arrangement according to a fifth example.
Figure 7:
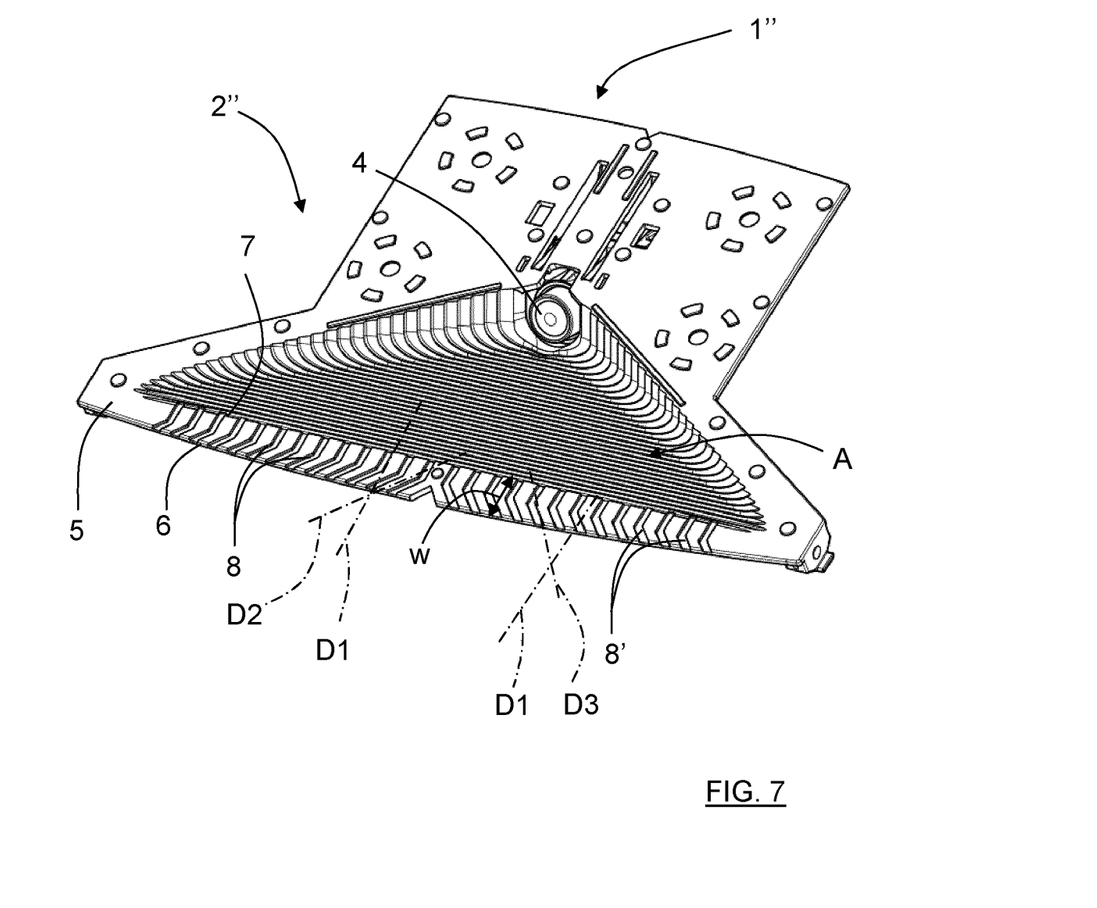
FIG. 7 shows a schematic top perspective view of a lens assembly mounted to a light trap arrangement that is comprised in a mounting bracket.

FIG. 6D shows a schematic top view of channels formed in the light trap arrangement according to a fifth example. According to some aspects, channels 8$d$ extend between an inside edge 7$d$ and an outside edge 6$d$ in a plurality of different extension directions Dd1, Dd2, such that an inverted "S"-shape is obtained.

For the fourth example and the fifth example, the channels 8$c$, 8$d$ extend in an arcuate manner such that a plurality of different extension directions Dc1, Dc2; Dd1, Dd2 (only a few extension directions are indicated) are formed.

According to some aspects, similar extension directions, such as a first extension direction Db1 and a third extension direction Db3 in the third example, can be directed in a common direction.

For the examples described with reference to FIG. 6A-6D, there may be two pluralities of channels which are mirrored in a symmetry line S as described for the first examples. There can alternatively be only one plurality of channels or more than two pluralities of channels.

According to some aspects, the channels D1, D2; D1, D3 are coated by a matte microstructure. In this way, reflections in the inner walls 13, 14, 15 are minimized, and light rays that hit the inner walls are thus prevented from propagating by means of reflections.

According to some aspects, as shown in FIG. 2, the light-trap arrangement 2" is comprised in a mounting bracket 2". Such a mounting bracket 2" can be pre-mounted and the rest of the camera device 1" can be attached to the mounting bracket 2" afterwards.

The present disclosure is not limited to the examples above, but may vary freely within the scope of the appended claims. For example, a matte microstructure can be formed as a texture in an injection molding tool that is used for molding the light-trap arrangement 2. Such a texture can for example be formed by means at least one of photo etching, electrical discharge machining, abrasive sand blasting, and laser. As an alternative, a matte coating can be added after molding the light-trap arrangement 2.

Examples of different shapes for channels have been provided, and clearly the shapes may vary in many different ways within the scope of the present disclosure. Adjacent channels can have different shapes, and there may be a plurality of different shapes along a rim border. Alternatively, only one shape is used along a rim border, the shape thus being the same for all channels.

With reference to FIG. 1, the digital camera device 1 may be of any suitable kind, and may be placed in any suitable position in the vehicle 24.

The channels have been shown having a constant width and constant depth, but can of course have tapered and/or otherwise varying shapes with regard to width and depth. FIG. 5B indicates a rectangular cross-section, many other cross-sectional shapes are of course conceivable, such as triangular or wave-form patterns; even varying cross-sectional shapes along a channel's extension are possible.

According to some aspects, the digital camera device 1 comprises a power assembly, an interface assembly and a control unit, which all are positioned at and/or within the camera housing.

According to some aspects, the light-trap arrangement 2 is made in a plastic material. According to some aspects, the camera housing 3 is made in a plastic material and/or a metal material.

According to some aspects, the light-trap arrangement 2 is designed to maximize the number of times that light rays hit the inner walls before entering the camera or hits the windshield, thus lowering the potential energy of the rays before they hit a surface visible to the camera.

The invention claimed is:

1. A light-trap arrangement that comprises:
a lens opening adapted to receive a camera lens assembly; and
a rim border that is adapted to abut a vehicle windshield and has a width that extends between an outside edge and an inside edge, wherein the rim border at least partially defines an area inside the inside edge and comprises a plurality of channels that fluidly connect the outside edge and the inside edge, wherein each channel of the first plurality of channels comprises inner walls, wherein a first channel of the plurality of channels forms a first shape extending in a first direction from the outside edge to the inside edge and a second channel of the plurality of channels forms a second shape extending in a second direction from the outside edge to the inside edge, wherein the first shape is different than the second shape, and wherein the first direction is different than the second direction.

2. The light-trap arrangement according to claim 1, wherein at least one inner wall of the second channel extends in an arcuate manner.

3. The light-trap arrangement according to claim 1, wherein the plurality of channels are coated by a matte microstructure.

4. The light-trap arrangement according to claim 3, wherein the matte microstructure is formed as a texture in an injection molding tool that is used for molding the light-trap arrangement, where the texture is formed by one or more of photo etching, electrical discharge machining, abrasive sand blasting, and lasering.

5. The light-trap arrangement according to claim 1, wherein a light beam that enters the second channel via an outside opening at the outside edge is obscured from exiting the second channel via an inside opening at the inside edge, each opening being defined by the inner walls and the open side.

6. The light-trap arrangement according to claim 1, wherein the light-trap arrangement is comprised in a mounting bracket.

7. The light-trap arrangement according to claim 1, wherein the first channel has a rectangular cross-section, a triangular cross-section, or a cross-section that follows a wave-form pattern.

8. A camera device, adapted to be mounted in a vehicle, where the camera device comprises:
   a camera housing;
   a lens assembly; and
   a light-trap arrangement that comprises a lens opening, adapted to receive the lens assembly, and a rim border that is adapted to abut a vehicle windshield and has a width that extends between an outside edge and an inside edge, wherein the rim border at least partially defines an area inside the inside edge and comprises a plurality of channels that fluidly connect the outside edge and the inside edge, wherein each channel of the first plurality of channels comprises inner walls, wherein a first channel of the plurality of channels forms a first shape extending in a first direction from the outside edge to the inside edge and a second channel of the plurality of channels forms a second shape extending in a second direction from the outside edge to the inside edge, wherein the first shape is different than the second shape, and wherein the first direction is different than the second direction.

9. The camera device according to claim 8, wherein at least one inner wall of the second channel extends in an arcuate manner.

10. The camera device according to claim 8, wherein the first plurality of channels are coated by a matte microstructure.

11. The camera device according to claim 10, wherein the matte microstructure is formed as a texture in an injection molding tool that is used for molding the light-trap arrangement, where the texture is formed by one or more of photo etching, electrical discharge machining, abrasive sand blasting, and lasering.

12. The camera device according to claim 8, wherein a light beam that enters the second channel via an outside opening at the outside edge is obscured from exiting the second channel via an inside opening at the inside edge, each opening being defined by the inner walls and the open side.

13. The camera device according to claim 8, wherein the light-trap arrangement is comprised in a mounting bracket.

14. The camera device according to claim 8, wherein the first channel has a rectangular cross-section, a triangular cross-section, or a cross-section that follows a wave-form pattern.

15. A vehicle comprising:
   a windshield;
   a camera housing;
   a lens assembly; and
   a light-trap arrangement that comprises a lens opening, adapted to receive the lens assembly, and a rim border that is adapted to abut the windshield and has a width that extends between an outside edge and an inside edge, wherein the rim border at least partially defines an area inside the inside edge and comprises a plurality of channels that fluidly connect the outside edge and the inside edge, wherein each channel of the first plurality of channels comprises inner walls, wherein a first channel of the plurality of channels forms a first shape extending in a first direction from the outside edge to the inside edge and a second channel of the plurality of channels forms a second shape extending in a second direction from the outside edge to the inside edge, wherein the first shape is different than the second shape, and wherein the first direction is different than the second direction.

* * * * *